Jan. 27, 1970

MASAO SUGI 3,491,525

METHOD FOR STRANDING IN THE MANUFACTURE OF COMMUNICATION
CABLES AND STRANDING APPARATUS

Filed Feb. 16, 1966

INVENTOR.
MASAO SUGI
BY
CAROTHERS & CAROTHERS
HIS ATTORNEYS 3,491,525
METHOD FOR STRANDING IN THE MANUFACTURE OF COMMUNICATION CABLES AND STRANDING APPARATUS
Masao Sugi, Kamakura, Japan, assignor to Sumitomo Electric Industries, Ltd., Osaka, Japan, a company of Japan
Filed Feb. 16, 1966, Ser. No. 527,889
Claims priority, application Japan, Feb. 17, 1965, 40/9,254
Int. Cl. D01h 13/26, 7/02; D07b 3/02
U.S. Cl. 57—34                    7 Claims

ABSTRACT OF THE DISCLOSURE

An apparatus and method for the lay-reverse stranding of cable component strands with a rotary accumulator wherein the component strands are converged to a common axis to form a group of component strands which is accumulated for a predetermined length on the rotary accumulator and alternately drawn therethrough at a first level of velocity for said predetermined length and second different level of velocity for said predetermined length in the same direction, while the accumulator is simultaneously rotated about its axis in one direction at constant revolutions per unit time to impart a lay-reverse stranding distribution to the group of component strands.

---

Figure 1:
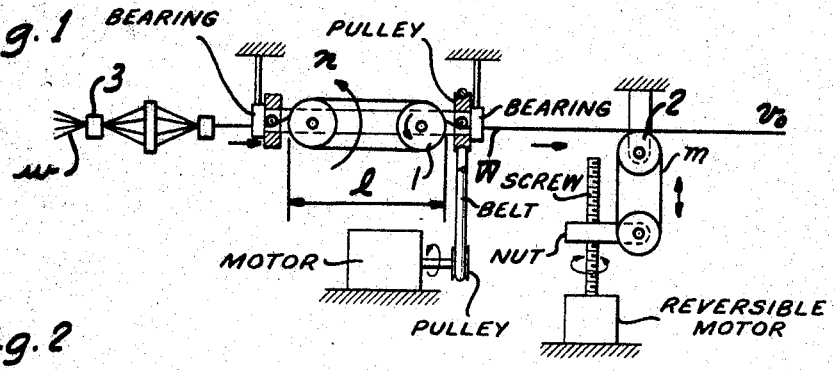

The present invention relates to the apparatus and method for stranding a plurality of insulated wires or a plurality of pairs or quads in the manufacture of communication cables.

In manufacture of communication cables, enhancement of stranding efficiency is one of the most important problems. For this purpose, much study has been made concerning the increase of stranding speed and the tandemization of the process for stranding insulated wires into a pair or a quad with the process for unitizing them into a cable unit.

Stranding methods heretofore employed in the manufacture of communication cables are: first, one in which a cage provided with a plurality of supply bobbins is rotated and wires therefrom are stranded to reel on the take-up device; second, one in which the axes of the supply bobbins are stationary while the take-up device is rotated as a whole; third, and one in which the wires paid off or taken rotate around the supply or the take-up device with a flyer.

In the case of the first-mentioned method, there takes place a great centrifugal force because the cage provided with supply bobbins is rotated, so that it is impossible to attain a large number of revolutions for a given unit of time. Stranding speed is therefore low. Furthermore, it takes much time and trouble to set and reset supply bobbins in the cage.

In the case of the second-mentioned method, stranding speed can be made comparatively high. However, as the take-up bobbin itself is rotated, it takes much time and trouble to attach and detach a take-up bobbin as is the case of the first-mentioned method. Furthermore, it is impossible with this method to continuously carry out the stranding of insulated wires and unitizing of stranded pairs or quads in a tandemized operation.

In the case of the third-mentioned method, stranding speed is comparatively high but it is not convenient to attach and detach the supply or take-up bobbins.

The purpose of the present invention is to eliminate the above-mentioned shortcomings and furnish a new stranding method, and an apparatus therefor, in which both the supply bobbins and a take-up device are fixed, i.e. all of the axes of the supply bobbins and the take-up device are stationary.

The first object of the present invention relates to a manufacturing method in which a plurality of elementary wires are accumulated on a device rotating in a certain direction and are rotated together with said device, and said group of elementary wires are stranded into a lay-reversed strand alternately reversing the lay direction along said strand by changing the drawing speed of said strand.

The second object of the present invention exists in relates to a basic stranding apparatus which comprises a device for putting a plurality of elementary wires in order or in alignment, a rotary accumulating device, so called a rotary accumulator as it accumulates the elementary wires put in order and rotates in one given direction, and a driven dancing roller device which generates a drawing speed change of the elementary wires being stranded to make a lay-reversed strand and absorbs a certain amount of strands appearing due to the speed difference between the changing drawing speed and the constant take-up speed.

The third object of the present invention relates to a stranding apparatus comprising a device for putting a plurality of elementary wires in order, a rotary accumulator for accumulating the elementary wires put in order and rotating in a given direction, a driven dancing roller device which generates wire drawing speed change to make a lay-reversed strand and absorbs a certain amount of strands appearing due to the speed difference between the changing stranding speed and the constant take-up speed, and a device for correcting irregularities in lay length of the stranded group of elementary wires, i.e. the lay-reversed strand.

The fourth object of the present invention relates to an apparatus of said second and third objects in which a plurality of sets of rotary accumulators are arranged in tandem in such a manner that the direction of rotation of adjacent tandemized rotary accumulators is opposite.

The fifth object of the present invention resides in the provision of an apparatus in which stranding apparatuses having said second, third or fourth objects are arranged in parallel and a plurality of groups of elementary wires stranded by each of the stranding apparatuses are again stranded into a cable unit in a manner similar to the method of stranding the elementary wires.

Other objects and advantages appear hereinafter in the following description and claims.

Figure 2:
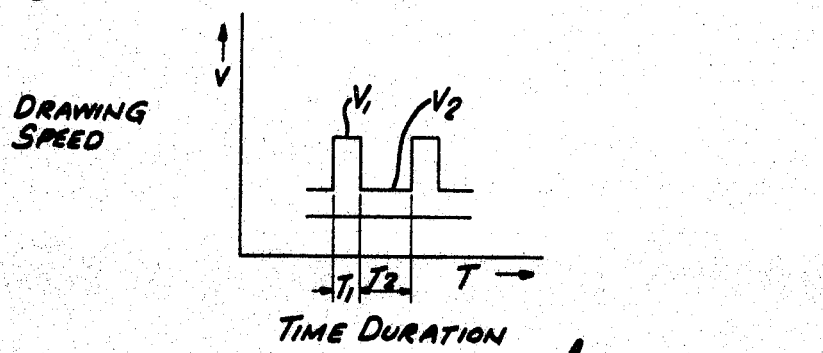
Figure 4A:
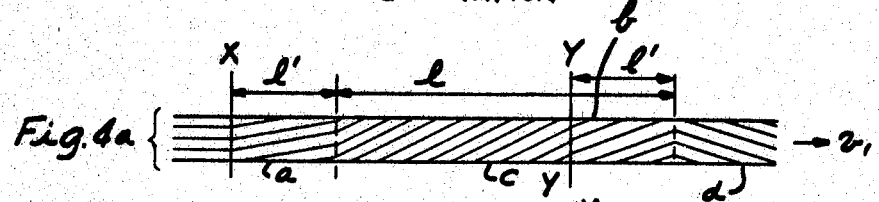
Figure 3:
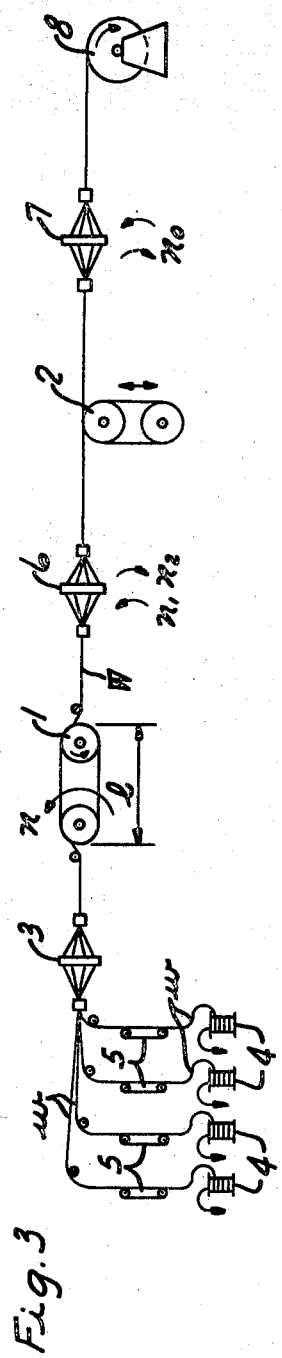
Figure 5:
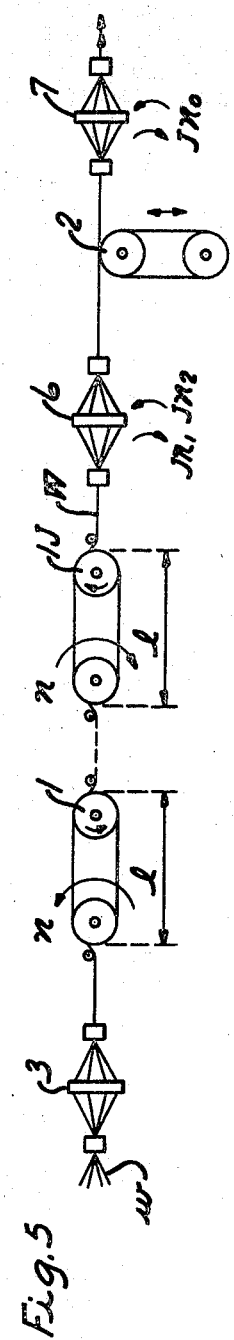
Figure 6:
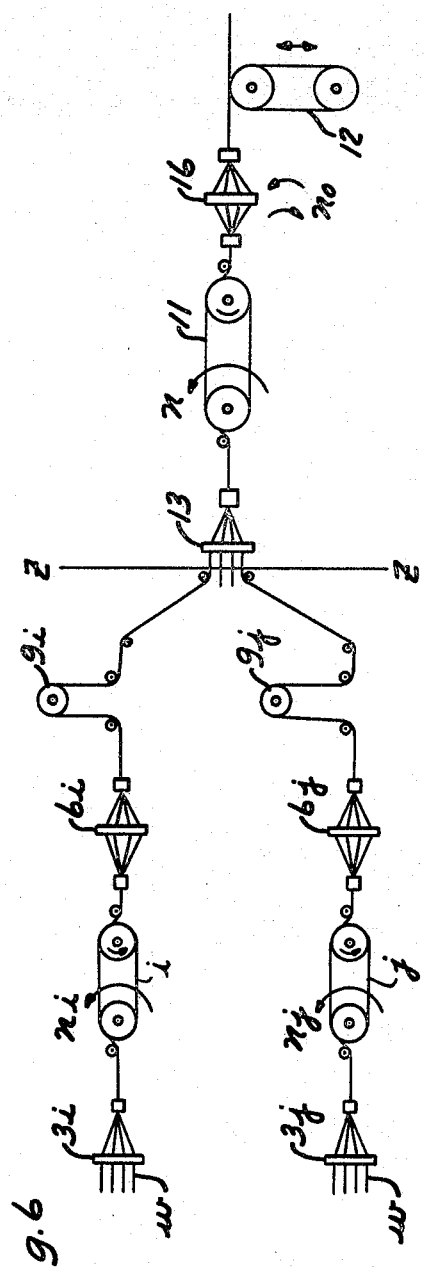

The accompanying drawings show, for the purpose of exemplification without limiting the invention or the claims thereto, certain practical embodiments illustrating the principles of this invention wherein:

FIGURE 1 is a block diagram showing the basic principle of the present invention. FIGURE 2 shows a graph representing the relationship between the crange in drawing speed of wire groups verses time. FIGURE 3 is a block diagram illustrating a practical embodiment of the present invention. FIGURE 4 is a diagram to explain the directions of the lay given to the wire groups. FIGURES 5 and 6 are block diagrams illustrating other embodiments of the present invention.

FIGURE 1 is a block diagram showing the basic principle of the present invention. In the figure 1 denotes the rotary accumulator, which, for example, comprises a plurality of wheels divided in two groups mounted for rotation on spaced parallel shafts respectively which are fixed relative to each other as by a common frame. The rotary accumulator accumulates a length $l$ of the group of elementary wires, i.e. $l$ is the accumulated length of the strand from the accumulator entrance to its exit, and is rotated by any suitable driving means at a constant speed $n$ in a definite or one given direction only (for example, in the direction indicated by the arrow) around the axis along which the group of elementary wires is drawn. The dancing roller device 2 is used to accumulate a certain amount of the stranded group of elementary wires $\overline{W}$ and also to change the drawing speed of the group of elementary wires from the rotary accumulator by driving the movable roller of the dancing roller device toward and away from the stationary roller to change the accumulated amount of the strand. The movable roller may be driven from any suitable reversible drive means such as a reversible worm gear drive which is reversed by limit switches and is driven through independent gear ratios on each reversal.

The guiding face plate 3 is a device for the alignment of insulated elementary wires or pairs or quads $w$.

In explaining the principle of stranding let the counter-clockwise rotation $n$, upon viewing FIG. 1 from the left side, be referred to as the positive direction of rotation, and let left-hand stranding lay of the elementary wires be regarded as positive lay.

Now, let the length of the group of elementary wires accumulated on the rotary accumulator 1 be represented by $l$, and let the drawing speed be changed with time in two steps so that the relationship between speed $v$ and time duration $\tau$ of drawing out the group of elementary wires from the rotary accumulator 1 by the length of $l$ will be $$v_1\tau_1 = v_2\tau_2 = l \quad (1)$$

(see FIGURE 2).

If the drawn speed is maintained constant at $v$, a twist of $$+\frac{n}{v}$$

per unit length is given when the group of elementary wires enters 1 and a twist of $$-\frac{n}{v}$$

when it comes out of 1, so that the group of elementary wires entering and then leaving 1 would have the same form as before entering 1 or is twisted then untwisted such that it finally exists in its original untwisted form. According to the present invention, however, the drawing speed changes for every length $l$, as already mentioned, with the result that the group of elementary wires of every accumulated length $l$ is given a twist of a lay length $\rho$ of $$\pm \frac{1}{n\left(\frac{1}{v_2} - \frac{1}{v_1}\right)}$$

the lay direction being reversed alternately for every accumulated length $l$.

The mean speed ($v_0$) at this time, which is equal to the take-up speed, is $$\frac{1}{v_0} = \frac{1}{2}\left(\frac{1}{v_2} + \frac{1}{v_1}\right) \quad (2)$$

and $$\frac{1}{n\rho} = \frac{1}{v_2} - \frac{1}{v_1} \quad (3)$$

From the Formulae 2 and 3, $$\frac{1}{v_0} = \frac{1}{v_2} - \frac{1}{2}\frac{1}{n\rho}$$
$$= \frac{1}{v_2} + \frac{1}{2}\frac{1}{n\rho} \quad (4)$$

$$\frac{v_0}{n\rho} = 2\frac{v_1 - v_2}{v_1 + v_2} < 2 \quad (5)$$

The desired two steps of drawing speeds $v_1$ and $v_2$ may well be obtained by means of the dancing roller device 2, the movable wheels or wheel being moved downward in FIGURE 1 for the duration $\tau_1$ at the speed of $$\frac{1}{2m}(v_1 - v_0)$$

and upwards for the next duration $\tau_2$ at the speed of $$\frac{1}{2m}(v_0 - v_2)$$

where $m$ represents the nmuber of turns of the strand around the movable wheels.

By rotating the rotary accumulator 1 in a definite direction and by moving the movable wheels of the dancing roller device as mentioned above, it is easily possible to give the group of elementary wires twists which reverse in lay direction at every length $l$ along the strand.

Furthermore, the mechanical structure is simple because the dancing roller device which generates the two steps of the drawing speed is outside of or disassociated from any revolving part (such as a rotary accumulator). In addition, fixed supply bobbins and a fixed take-up bobbin can be used because twists are given to the wires by the above-mentioned means. As the take-up device need not rotate around the strand axis for twisting, it is possible to increase the stranding speed and tandemize the operation for stranding insulated wires into a pair or a quad and thereafter the operation for stranding said pairs or quads into a cable unit, in other words, to carry out these stranding operations without interruption.

FIGURE 3 is a block diagram showing a concrete embodiment of the present invention. In the figure, the same reference numerals represent the same elements as in FIGURE 1.

In FIGURE 3, ($\overline{w}$) denotes the elementary wires to be stranded together, such as insulated wires, pairs of quads, 4 denotes the fixed supply bobbins, 5 dancing rolls for maintaining the tension of the elementary wires $w$ and feeding them to the guiding face plate 3, 6 the holed face plate for correcting the irregularities of the twist of the group of elementary wires $\overline{w}$, 7 the holed face plate for correcting the irregularities of the twists of the stranded group of elementary wires or a lay-reversed strand whose take-up speed is kept constant, and 8 the device to take up the strand. This device 8 rotates in the direction indicated by the arrow to take up the strand, but its supporting stand does not rotate.

The correcting holed face plates 6 and 7 both have to oscillate or rotate in reverse directions alternately in terms of time in order to correct the irregularities of the twists of the group of elementary wires stranded into reversed lay form. In this case, it is permissible if face plate 7 is rotated at definite speeds $\pm N$ in either direction. With 6, however, it is necessary to change the direction of rotation and speed of revolution in relation to the two steps of the drawing speed. The numbers of revolutions $n_1$ and $n_2$ of the holed face plate 6 may therefore be made as follows:

$$n_1 = -n\left(\frac{V_1}{V_2} - 1\right)$$

$$n_2 = n\left(1 - \frac{V_2}{V_1}\right)$$

The duration of rotation may be equal to the duration of movement of the dancing roller device $2\tau$, and $\tau_2$ for $n_1$ and $n_2$ respectively, and the total angle of rotation $$\mp \frac{l}{\rho} \times 360°$$

The number of revolutions $n_0$ of the holed face plate 7 may be $$\mp \frac{n_0}{\rho} = \mp 2n\frac{v_1 - v_2}{v_1 + v_2}$$

and the duration $$\tau_0 = \frac{\tau_1 + \tau_2}{2}$$

the total angle of rotation $$\mp \frac{l}{p} \times 360°$$

Next I will explain the stranding method of the present invention in a concrete way with reference to FIGURE 3. (FIGURE 3 shows the case of quad stranding for example.)

Four insulated wires (elementary wires for stranding) *w* are supplied from the fixed supply bobbins 4, whose tension is kept constant by means of the dancer rollers 5. The insulated wires *w* are sent to the stationary holed face plate 3 for alignment. The group of insulated wires (group of elementary wires) that have been aligned is accumulated with the length *l* on the rotary accumulator 1 and rotated with a speed *n* by the rotary accumulator 1 in a definite direction (the direction shown with the arrow).

Here the accumulation does not mean that the wires remain stationary on 1, but means that they are supplied all the time from the left side of FIGURE 3 at a speed of $v_1$ or $v_2$ and are drawn out at the right side of the accumulator. Suppose the group of elementary wires accumulated has been given such twists at the inlet of accumulator 1 at the drawing speed $v_2$ as shown as *c* in FIGURE 4a. This accumulated group of elementary wires *c* is drawn out of the accumulator exit for the duration $\tau_1$ at a higher speed, $v_1$ by the action of the dancing roller device 2. Now the resultant lay distribution of the accumulated wires at the instant when the twisting action has advanced by length $l^1$, is shown at *b* in FIGURE 4a.

In the figure, X—X denotes the inlet to the rotary accumulator 1 and Y—Y its outlet. If the accumulated wires are drawn out at the higher speed $v_1$ by the length of $l^1$, (this naturally assumes that the same group of accumulated wires were drawn into the accumulator at the slower speed $v_2$) the group of elementary wires that has been given the lay distribution shown as *c* increases its lay length as shown at *b* in FIG. 4a at the point Y—Y. The portion of the group of elementary wires which still remains on the rotary accumulator 1 remains to have the lay length of *c* until it passes point Y—Y, but the portion newly accumulated on entering at X—X for a length $l^1$ is accumulated with a lay length as shown at *a* in FIG. 4a. If this speed $v_1$ is continued for the duration $\tau_1$, all the remaining *c* portion with its indicated lay distribution will be replaced by the lay distribution of the wire group or portion *b*.

Figure 4B:
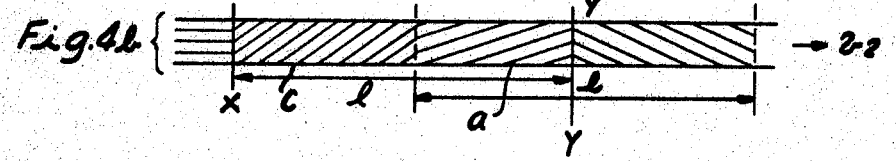

As the moving direction of the movable wheels of the dancing roller device is reversed and the drawing speed is changed to $v_2$, the situation will become as shown in FIGURE 4b. That is to say, the portion that has been accumulated with the lay length and distribution *a* comes to have the lay length and distribution *d* in the reverse direction as it emerges from the accumulator at point Y—Y, while a portion with the lay length and distribution *c* comes to be accumulated with the indicated lay distribution as it passes through point X—X. If these operations are continuously repeated every accumulated length, *l*, the group of wires is drawn out of the accumulator with the lay length and distribution *b* when the speed is $v_1$ and with the lay length and distribution *d* which is equal to a lay distribution of *b* when the speed is $v_2$. These lay lengths or lay distributions *b* and *d* thus alternate for every accumulated length *l*.

The group of elementary wires or the strand which has thus been given twists of the reversed lay for every length *l* is sent to the correcting holed face plate 6 which rotates alternately in opposite directions to correct irregularities in stranding and is accumulated on the dancing roller device 2. After passing through the dancing roller device 2, said strand is then sent to the next correcting holed face plate 7 where irregularities in stranding are again corrected, and is thereafter wound on the take-up device 8.

In the example of FIGURE 3, it is permissible, if necessary, to use either one of the correcting holed face plates 6 or 7 without the other and it is also permissible to coat the lay-reversed strand with adhesive or to instead place a binding on the lay-reversed strand to prevent the collapse of the twists of the strand, especially around the portions where the lay direction is reversed, after the lay-reversed strand has come through the holed face plate 7, or plate 6 if there is no plate 7.

As shown in FIGURE 5, a plurality of rotary accumulators may be installed in tandem in order to obtain a shorter lay length by the same number of per unit time and the same drawing speed as described previously. In this case, it is necessary to arrange the rotary accumulators (1 . . . IJ) so that each of an adjacent two has a rotary direction opposite to the other. In this case, twists of the same lay length as given by the first rotary accumulator 1 are given by each of the other rotary accumulators 2 . . . J so that a lay length of 1/J is obtained as if obtained with one accumulator of the same number of revolutions *n* times a factor of J and the same drawing speed. If the lay length is to be definite, then it is possible to decrease the number of revolutions, which results in possibility of increasing the drawing speed. It is necessary in this case to multiply by a factor of J, the number of revolutions of the correcting holed face plates 6 and 7.

FIGURE 6 is a block diagram of an apparatus for simultaneously stranding insulated wires into pairs or quads and unitizing a plurality of the pairs or the quads obtained as a result of said stranding in tandemized operations. Here the principle illustrated in FIGURE 2 is applied and the apparatuses explained with reference to FIGURES 1 and 3 are combined in parallel and in series. In FIGURE 6, the left side of Z—Z represents the first stranding apparatuses for stranding insulated wires for example, and the right side of Z—Z represents the second stranding apparatus i.e. apparatus for unitizing a plurality of the lay-reversed strands into a cable unit.

In the first stranding apparatus on the left side of Z—Z are laid out in parallel, a plurality *i* . . . *j* of the stranding devices of the present invention. The second stranding apparatus on the right of Z—Z is also based on the same principle, where the rotary accumulator is denoted by 11, the dancing roller device by 12 and the holed face plates by 13 and 16.

*gi* and *gj* are devices for providing different length supply paths to make the distance along strands from *bi* through *bj* to 13 different such that the strands having a lay direction-reversed portion is spaced from or not lying side by side with another such portion in a cable unit.

By the use of the apparatus described above, it is made possible to strand insulated wires into pairs or quads and thereafter unitize them into a cable unit in tandem operation. Such tandemization is one of the greatest advantages in the use of the apparatuses of the present invention.

Another object of the present invention is to furnish an apparatus which solves the problems encountered when putting in practice the two step drawing speed-reversed lay-stranding apparatus described above.

In changing the drawing speed in the reversed lay-standing apparatus as described above, the speed change action of said dancing roller device affects not only the wire speed of the group of elementary wires being drawn through the rotary accumulator but also the feeding speed of elementary wires paid off from the supply bobbins to be stranded together. Consequently, it is necessary for the circumferential speed of the supply bobbins to make a two-step change in accordance with the pay-off speed of the elementary wires to be stranded together. In order to obtain a good reversed lay-stranding, it is necessary to have the wire speed of the group of elementary wires passing through the rotary accumulator make a timewise change in the form of rectangular waves. However, if the circumferential speed of the supply bobbin which is heavy with elementary wires wound thereon is changed in the form of rectangular waves, an excessive tension may be applied to the elementary wires at the instant of increasing the speed and might break the wires. Furthermore, when the speed is decreased, the force of inertia of the bobbin prevents the pay-off speed of the elementary wires from slowing down in a short time. This may cause entanglement of the elementary wires. In a reel supply system, such an appropriate pay-off device as a flyer should be attached or an inversely oscillating dancer as indicated at 5 should be placed between the supply stand and each rotary cradle or accumulator 1 to alleviate these problems.

I claim:
1. In the manufacture of communication cable, the method of lay-reverse stranding cable component strands with a rotary accumulator adapted to accumulate a predetermined length of grouped component strands comprising the steps of aligning and converging the component strands to a common axis to form a group of the component strands, accumulating the grouped component strands on said accumulator, alternately drawing the grouped component strands from and through said accumulator at a first level of velocity for said predetermined length and second different level of velocity for said predetermined length in the same direction, and simultaneously rotating said accumulator axially in one direction at constant revolutions per unit time to impart a lay-reverse stranding distribution to the group of component strands.

2. The method of claim 1 wherein said cable component strands are lay-reversed stranded groups of elementary wires provided by the steps of providing a plurality of unstranded elementary wire groups, accumulating each elementary group on independent rotary accumulators for a preselected length, axially rotating each independent accumulator in one direction at constant revolutions per unit time, and directing the elementary groups from each of the independent accumulators over paths of different lengths to provide said cable component strands.

3. An apparatus for the lay-reverse stranding of cable component strands in the manufacture of communication cable comprising supply means to simultaneously supply said component strands, aligning and grouping means to align, converge and group said component strands to a common axis, a rotary accumulator adapted to accumulate a predetermined length of said grouped component strands, means to axially rotate said accumulator in one direction at constant revolutions per unit time, and draw means to alternately draw said grouped component strands axially from said accumulator at a first level of velocity for said predetermined length and second different level of velocity for said predetermined length in the same direction to impart a lay-reverse stranding distribution to said grouped component strands.

4. The apparatus of claim 3 characterized by means positioned intermediate said supply means and said grouping means to absorb the alternate changes in drawing velocity imparted to said cable component strands.

5. The apparatus of claim 3 characterized by alignment means positioned intermediate said grouping means and said accumulator to align said grouped component strands.

6. The apparatus of claim 3, said draw means characterized by a dancing roller device consisting of spaced shafts with at least one pulley wheel mounted for axial rotation on each shaft to alternately receive and accumulate passes of the lay-reverse stranded cable, drive means to oscillate said shafts relative to each other in their parallel plane and thereby provide said alternating levels of drawing velocity, and a take-up device to receive and draw said cable from said dancing roller device at a constant velocity.

7. The apparatus of claim 3 characterized by a plurality of said rotary accumulators arranged in tandem to sequentially receive said grouped component strands from one accumulator to the next, each of said accumulators being axially rotated at constant revolutions per unit time in the opposite direction of any immediately adjacent accumulator.

References Cited

UNITED STATES PATENTS

| | | | |
|---|---|---|---|
| 2,981,049 | 4/1961 | Crosby et al. | 57—66.5 |
| 3,169,360 | 2/1965 | Corrall et al. | 57—34 |
| 3,025,656 | 3/1962 | Cook | 57—34 |
| 3,373,549 | 3/1968 | Shaw | 57—34 |
| 3,373,550 | 3/1968 | Symonds | 57—34 |
| 2,956,391 | 10/1960 | Demmel et al. | 57—58.52 X |
| 2,985,994 | 5/1961 | Menke et al. | 57—58.52 |

STANLEY N. GILREATH, Primary Examiner

W. H. SCHROEDER, Assistant Examiner

U.S. Cl. X.R.

57—63, 91, 156